United States Patent [19]

Smith

[11] Patent Number: 5,277,225
[45] Date of Patent: Jan. 11, 1994

[54] UNDERSEA HYDRAULIC COUPLING WITH PRESSURE-ENERGIZED SEALS

[75] Inventor: Robert E. Smith, Stafford, Tex.

[73] Assignee: National Coupling Company, Inc., Stafford, Tex.

[21] Appl. No.: 920,802

[22] Filed: Jul. 28, 1992

[51] Int. Cl.[5] .......................... F16L 29/00; F16L 37/22
[52] U.S. Cl. .............................. 137/614.04; 251/149.1; 285/917; 277/63; 277/71
[58] Field of Search ................... 137/614.04, 614.05; 251/214, 149.1, 149.6; 285/111, 108, 917; 277/63, 71, 72R; 277/79; 277/DIG. 8

[56] References Cited

U.S. PATENT DOCUMENTS

| | | | |
|---|---|---|---|
| 1,913,982 | 6/1933 | Fox | 285/111 |
| 3,147,015 | 9/1964 | Hanback | 277/205 |
| 3,163,431 | 12/1964 | Tannner | 277/206 |
| 3,288,472 | 11/1966 | Watkins | 277/11 |
| 3,378,269 | 4/1968 | Castor | 277/205 |
| 4,637,470 | 11/1987 | Weathers et al. | 166/344 |
| 4,694,859 | 9/1987 | Smith | 137/614.04 |
| 4,703,774 | 11/1987 | Seehausen | 137/614.04 |
| 4,709,726 | 12/1987 | Fitzgibbons | 137/614.04 |
| 4,754,780 | 12/1988 | Smith | 137/614.04 |
| 4,768,538 | 9/1988 | Mintz et al. | 137/15 |
| 4,813,454 | 3/1989 | Smith | 137/614.04 |
| 4,815,770 | 3/1989 | Hyne et al. | 285/917 X |
| 4,817,668 | 4/1989 | Smith | 137/614.04 |
| 4,832,080 | 5/1989 | Smith | 137/614.04 |
| 4,834,139 | 5/1989 | Fitzgibbons | 137/614.04 |
| 4,854,615 | 8/1989 | Smith | 285/331 |
| 4,858,648 | 8/1989 | Smith et al. | 137/614.04 |
| 4,884,584 | 12/1989 | Smith | 137/614.04 |
| 4,900,071 | 2/1990 | Smith | 285/379 |
| 5,015,016 | 5/1991 | Smith | 285/108 |
| 5,029,613 | 7/1991 | Smith | 137/614.04 |
| 5,052,439 | 10/1991 | Smith | 137/614.04 |
| 5,099,882 | 3/1992 | Smith | 137/614.04 |

Primary Examiner—Martin P. Schwadron
Assistant Examiner—Kevin L. Lee
Attorney, Agent, or Firm—Arnold, White & Durkee

[57] ABSTRACT

An undersea hydraulic coupling having a pair of flexible, pressure-energized seals is disclosed. The seals are configured to seal radially between the male and female members of the coupling so that hydraulic fluid does not leak from the annular space between the receiving chamber and outer surface of the male member. The coupling is pressure-balanced for fluid communication through mating radial passages and the annular space between the members.

19 Claims, 1 Drawing Sheet

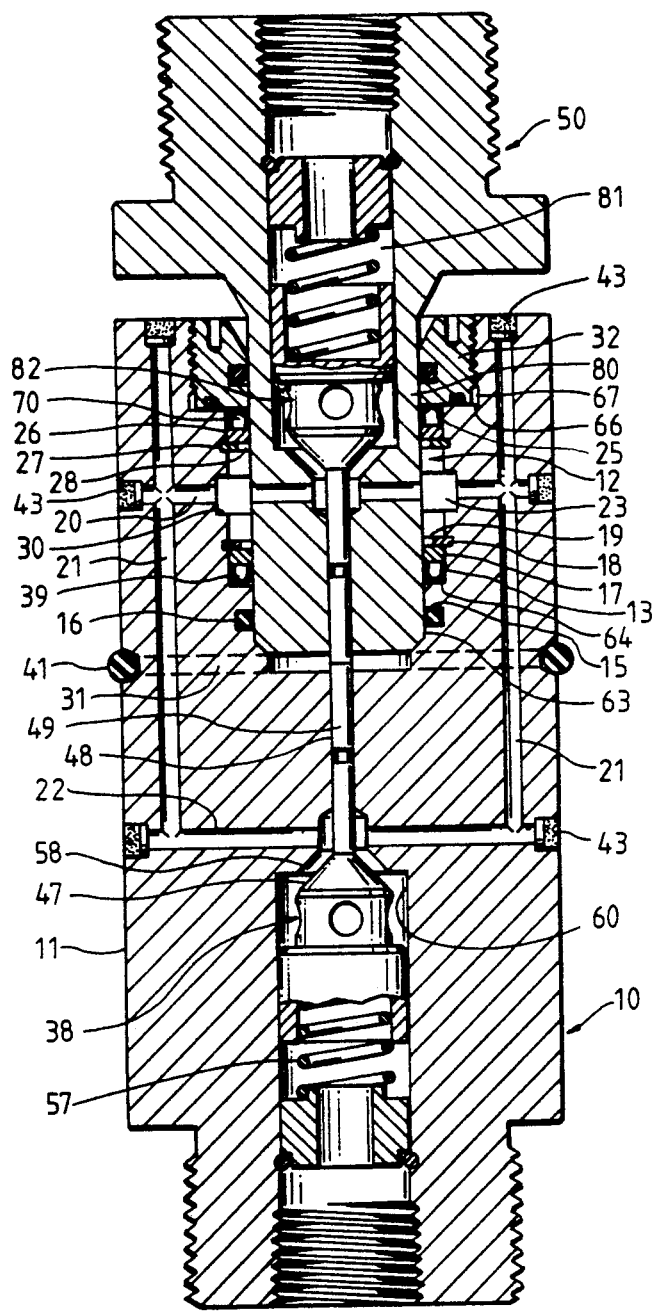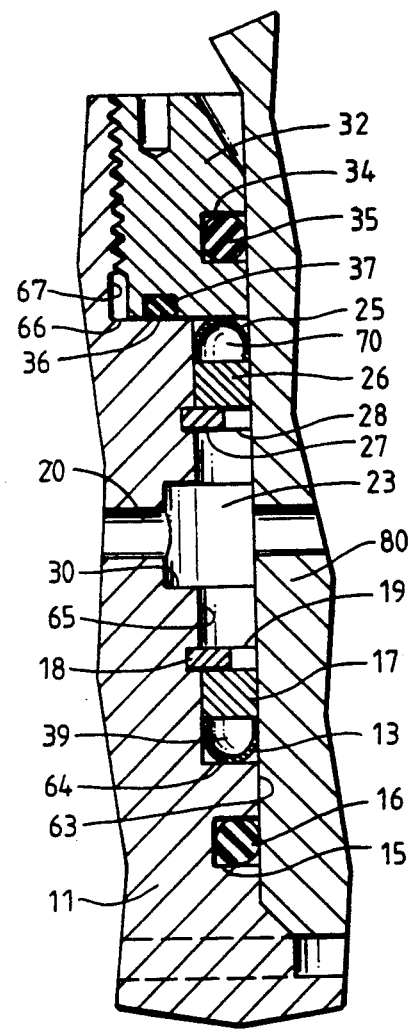
FIG.1
FIG.2

UNDERSEA HYDRAULIC COUPLING WITH PRESSURE-ENERGIZED SEALS

BACKGROUND OF THE INVENTION

1. Field of the Invention

This invention relates, in general, to hydraulic couplings, and specifically to hydraulic couplings used in undersea drilling and production applications. More particularly, the invention involves a hydraulic coupling with at least two flexible, pressure-energized seals positioned in the annular space between the male and female members.

2. Description of the Related Art

Subsea hydraulic couplings are old in art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member or probe includes a cylindrical portion at one end having an outer diameter approximately equal to the diameter of the large bore of the female member of the coupling. The male member also includes a connection at its outer end to facilitate connection to hydraulic lines. When the cylindrical portion of the male member is inserted into the large bore of the female member, according to various embodiments of the device, fluid flow is established between the male and female members.

In U.S. Pat. No. 4,694,859 to Robert E. Smith III, an undersea hydraulic coupling and metal seal is disclosed. This patent provides a reusable metal seal which engages the circumference of the probe and is positioned in the annulus between the male and female members. The metal seal is pressure-energized to expand radially inwardly and outwardly during use. The metal seal is held in place by a retainer.

Problems arise with use of hydraulic couplings in relatively high pressure systems due to the high axial forces imposed on the male and female members during the coupling operation and during their use. In such couplings, it is necessary for the fluid force opposing the face of the male or female member to be overcome before the fluid communication is established between the members. In a relatively high pressure system, high forces imposed on the valve members may render the connection of the male member to the female member very difficult. Also, during use, fluid pressure is exerted between the male and female members in such a way as to tend to separate them. The force necessary to join the members and the resultant tendency of the body members to separate are characteristic problems in the prior art. High pressure systems and undersea applications also experience problems associated with sealing the junction between the male and female members.

Ideally, hydraulic couplings should, as far as possible, be pressure balances so that fluid pressure does not hinder connection or urge separation of the male and female members. Preferably, to prevent loss of fluid in coupling or uncoupling, the members should include valve means to open automatically on coupling and close automatically on uncoupling. Finally, the coupling should employ seals which can withstand high pressures as well as the corrosive effects of adverse environments. The present invention solves all of these needs and requirements.

A pressure balances undersea hydraulic coupling is shown in U.S. Pat. No. 4,754,780 to Robert E. Smith III. In the '780 patent, hydraulic couplings are disclosed wherein fluid communication between the male and female coupling members is through radial fluid passages in the members.

In U.S. Pat. No. 4,832,080, a pressure balanced hydraulic coupling with metal seals is disclosed. In the '080 patent, a pair of metal seals are positioned to seal between the circumference of the male member and the central bore of the female member, and a seal retaining member having a radial passage is positioned in the annulus therebetween, such that the seals are on each side of the radial fluid passage. The seals in the '080 patent are pressure energized metal seals of the type shown in U.S. Pat. No. 4,694,859 to Robert E. Smith III. U.S. Pat. No. 4,754,780, 4,832,080 and 4,694,859 are incorporated herein by reference.

SUMMARY OF THE INVENTION

The present invention resides in a hydraulic coupling of the foregoing type, including male and female members for fluid communication therebetween, and two or more flexible, pressure-energized radial seals for sealing engagement between the members. The present invention provides an improved and simplified construction of seal retaining apparatus for retaining the seals in the annular space between the male member and the female member. The seals are positioned and retained with a pair of locator rings, and a pair of snap rings.

In a preferred embodiment, fluid passages in the male and female members are mutually positioned to allow connection or disconnection of the coupling members without substantial fluid pressure exerted axially against the face of the male member. The fluid passages also are mutually positioned so as to substantially prevent separation forces between the male and female members when the passages are pressurized by fluid.

In a preferred embodiment, fluid communication between the male and female members in the present invention preferably is established between a radial passageway at the outer longitudinal surface of the male member and a matching radial passageway in the side wall of the receiving chamber of the female member. The leading faces of mutually opposed valve stems in the two members come into contact with one another, and thereby urge check valves and their respective members into the open position. The seals are preferably a pair of radially flexible C-shaped metal seals positioned between the members such that a seal is on each side of the annular space. Fluid pressure in the coupling urges the seals to sealingly engage the receiving chamber and the outer circumference of the male member. A pair of locator rings and locking rings are used to retain the seals in the annular space upon separation of the male and female members.

BRIEF DESCRIPTION OF THE DRAWINGS

FIG. 1 is a section view of a preferred embodiment the male and female members of the coupling when connected.

FIG. 2 is a section view of the metal seals and retainers according to a preferred embodiment of the present invention.

DETAILED DESCRIPTION OF A PREFERRED EMBODIMENT

Referring to FIG. 1, a preferred embodiment of the present invention includes a female member 10, a male member 50 and a pair of flexible, pressure-energized radial metal seals 13, 25 for sealing engagement of the members when the male member is inserted into the female member. Radial metal seals 13, 25 are located at either end of annular space 23, the seals configured to prevent fluid from escaping out each end of the annular space. As backup seals, a second pair of flexible, pressure-energized metal seals may be included at each end of the annular space. Or, backup seals 16 and 35 may be used. A pair of seal locator rings 17, 26 and seal locking members 18, 27 also are positioned in annular space 23 to hold the metal seals 13, 25 in the annular space upon separation of the male and female members.

In a preferred embodiment, fluid communication is established without significant pressure exerted against the face of the male member during or after insertion, and preferably is established radially via a passageway 52 in the outer longitudinal surface of the male member and a corresponding radial fluid passageway 20 in the receiving chamber of the female member.

In the preferred embodiment shown in FIG. 1, the female member 10 includes body 11, receiving chamber 12, and valve assembly 38. The female member also includes a first radial passage 20, a longitudinal passage 21, and a second radial passage 22. Radial passage 20 communicates between the receiving chamber 12 and the longitudinal passage 21. Radial passage 22 communicates between the longitudinal passage 21 and the bore 48. The valve assembly 38 comprises a poppet valve 47 that is biased by valve spring 57 to a normally closed position against valve seat 58. Extending from the nose of the poppet valve is a stem or valve actuator 49 which slides within bore 48. Generally, the valve assembly is of the same type shown and described in U.S. Pat. No. 4,832,080, which is incorporated by reference.

A longitudinal bore begins at one end of the female member, where valve bore 60 is configured to receive valve assembly 38. The valve bore 60 is tapered inwardly to form a valve seat 58. After the valve seat there is a narrowed valve stem bore 48 for sliding insertion of the valve stem or valve actuator 49. Valve stem bore 48 extends longitudinally through the female member until reaching the receiving chamber 12.

In a preferred embodiment, receiving chamber 12 is stepped to include a first section 63, an internal shoulder 64, a second section 65, another internal shoulder 66, and a third section 67. The internal diameter of the first section 63 of the receiving chamber is dimensioned to slidably receive the male member or probe 50. The internal diameter of the second section 65 is greater than that of the first section 63, to provide an annular space 23 between the male and female members for the seals and seal retaining assemblies to be positioned therein. The internal diameter of the third section 67 of the receiving chamber is greater than that of the second section, and preferably is dimensioned to receive a threaded nut 32 or retainer locking member, as will be explained in more detail below.

A backup seal may be included in the first section 63 of the receiving chamber, to seal between the male member and the receiving chamber. In a preferred embodiment, this is an elastomeric seal 16 positioned in groove 15 in the first section of the receiving chamber.

In the second section 65 of the receiving chamber, in the embodiment shown in FIG. 1 and FIG. 2, the radial metal seals and seal retaining members are positioned in the annular space 23 between the male and female members. The first radial metal seal 13 is a flexible C-shaped annular metal seal that is positioned on shoulder 64 in the receiving chamber. The seal 13 has an internal cavity 39, and may be pressure energized to flex radially outwardly and inwardly in response to fluid pressure in the coupling, thereby enhancing the fluid seal formed between the male and female members. A locator ring 17 is positioned adjacent the open end of the cavity 39, and is retained in place by snap ring 18 in groove 19. Optionally, an internal shoulder (not shown) is provided in the wall of the receiving chamber to seat and position the locator ring 17.

In the embodiment of FIG. 1, first radial passage 20 is directed radially outwardly. The first radial passage 20 communicates with longitudinal passage 21, which then communicates with second radial passage 22. When the male member 50 is fully inserted within the female member receiving chamber 12, the radial passage 52 at the outer circumference of the male member meets the first radial passage 20 of the female member for fluid flow therebetween.

Optionally, slot 30 may be provided in the wall of the second section of the receiving chamber adjacent the annular space 23. However, without slot 30, annular space 23 in the second section of the receiving chamber provides a space for fluid communication between the radial passages of the members even if the coupling members are misaligned.

The metal seals 13 and 25 on each longitudinal side of the radial passageway 20 seal off fluid flow except between the respective radial passages of the male and female members. A second pair of metal seals (not shown) may be included on either side of metal seals 13, 25. Preferably, fluid flow between the male and female members is perpendicular to the longitudinal axis of the members. Accordingly, there is no longitudinal force exerted by the fluid on the face of the male member.

In a preferred embodiment, the second radial metal seal 25 is a flexible, pressure energized radial metal seal with a C-shaped cross-section. The cavity 70 in the seal is expansible in response to fluid pressure in the coupling, to expand the seal radially outwardly and inwardly. The radial metal seal 25 is positioned in the second section 65 of the receiving chamber to seal between the receiving chamber wall and the longitudinal surface of the male member. A spacer ring 26 is positioned adjacent the cavity 70 of the seal 25, and is retained by snap ring 27 in groove 28 in the receiving chamber wall.

Adjacent the seal 25 is internal shoulder 66 which defines another step in the diameter of the receiving chamber. Nut 32 is inserted in the third section 67 of the receiving chamber to abut shoulder 66. Nut 32 retains the seal 25 and locator ring 26 within the female member receiving chamber when the members are separated. Nut 32 is threaded to the third section of the receiving chamber. Nut 32 may include a groove 37 for insertion of an O-ring 36 to seal between the nut and the shoulder 66. The inner circumference of the threaded nut also may have a groove 34 for a backup seal, which preferably is an elastomeric seal 35, to seal between the nut and the male member 50.

The coupling of FIG. 1 also comprises a male member 50 which has a body 80, a central bore or valve bore 81, a valve assembly 82, and a radial passage 52. The male member and female member are generally connected to opposing plates of a manifold and are held together by bolts or hydraulic members attached to the plates. The male member is commonly attached to one plate while the female member is attached to a an opposing plate so as to face the male member and align with it. The male and female members may be attached to the manifold plates using various means, such as set screws or threads. Techniques for attaching the members to such manifold plates are well known to those skilled in the art. The male member 50 shown in FIG. 1 is substantially identical to that shown in U.S. Pat. No. 4,832,080, which is incorporated by reference.

In a preferred embodiment of the present invention, manufacture of the female members involves machining or drilling of the fluid passages therethrough. Because they are machined or drilled in the female member 10, the passages extend to the outer circumference of the female member and to the female member face, respectively, and are sealed with plugs 43. It will be understood that these passages extending to the outer circumference and face of the female member, and the plugs for closing the passages, are not essential to the inventive concept. If another manufacturing technique for producing the device, such as casting, is employed, the passages, extensions and plugs will not be required and may not be present.

As shown in FIG. 1, the female member 10 further includes one or more vent passages 31 for expelling water from the receiving chamber of the female member. Each vent passage connects between the central receiving chamber 12 and the outer longitudinal surface of the female member. Optionally, an annular vent hole seal 41 positioned in a vent seal groove is used to allow fluid flow only outwardly from the receiving chamber when the male member is inserted into the female member and fluid is urged out of the central receiving chamber. The vent passage provides a means for the trapped seawater to be forced from the receiving chamber upon entry of the male member. Thus, seawater or other extraneous fluid may escape through the vent passage and pressure will not build up to exert a separating force between the male and female members.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling, comprising:
   (a) a female member having a central bore extending along a longitudinal axis, a longitudinal passage generally parallel to the central bore, and first and second radial passages extending between the central bore and the longitudinal passage;
   b) a male member having an outer circumference, a longitudinal passage, and a third radial passage extending between the longitudinal passage and outer circumference of the male member, the male member insertable into the central bore forming an annular space between the third radial passage and the second radial passage;
   (c) a pair of pressure energized radial metal seals positioned adjacent each end of the annular space, the radial metal seals sealing between the male member and the central bore to prevent fluid from escaping out each end of the annular space; and
   (d) a pair of seal retaining means positioned in the annular space, each seal retaining means adapted to hold one of the radial metal seals in place upon removal of the male member from the central bore.

2. The undersea hydraulic coupling of claim 1 wherein the male member and the female member each have a normally closed poppet valve openable upon insertion of the male member into the central bore.

3. The undersea hydraulic coupling of claim 1 wherein the seal retaining means comprises a ring member and a snap ring engageable with a slot in the central bore of the female member.

4. The undersea hydraulic coupling of claim 1 wherein the central bore comprises an internal shoulder, and wherein one of the radial metal seals is positioned on the internal shoulder.

5. The undersea hydraulic coupling of claim 1, further comprising a vent passage between the central bore and the external surface of the female member.

6. The undersea hydraulic coupling of claim 1, further comprising a pair of backup seals, one of the backup seals positioned adjacent each of the radial metal seals.

7. An undersea hydraulic coupling, comprising:
   (a) a female member having a first end, a second end, a stepped bore having a first diameter adjacent the first end, a second larger diameter intermediate the first and second ends, and a third still larger diameter adjacent the second end; a fluid passage generally parallel the stepped bore and communicating with the second diameter of the bore through a fluid passage;
   (b) a male member slidable into the first diameter of the stepped bore, to provide a first annular space between the male member and the second diameter of the stepped bore, and a second annular space between the male member and the third diameter of the stepped bore; the male member having a fluid passage positionable to mate with the fluid passage of the female member;
   (c) a pair of pressure-energized radial metal seals in the second annular space for sealing between the male member and the stepped bore, one seal on each side of the fluid passages; and
   (d) a pair of seal retaining members for retaining the seals in the second annular space upon separation of the male and female members.

8. The undersea hydraulic coupling of claim 7 further comprising a third seal retaining member threaded to the female member.

9. The undersea hydraulic coupling of claim 7, wherein each of the seals is a C-shaped seal that is expansible radially inwardly and outwardly in response to fluid pressure in the coupling.

10. The undersea hydraulic coupling of claim 7 further comprising a pair of locator rings positionable in the second annular space adjacent each of the seals, and wherein the seal retaining members comprise a pair of locking rings engageable with the stepped bore of the female member to secure the locking rings in the second annular space on each side of the radial fluid passages of the male and female members.

11. The undersea hydraulic coupling of claim 8 further comprising a pair of backup seals for sealing between the male member and the female member.

12. The undersea hydraulic coupling of claim 11 wherein the pair of backup seals comprises a first elastomeric seal positioned in a groove in the first diameter of the stepped bore, and a second elastomeric seal positioned in a groove in the third seal retaining member.

13. An undersea hydraulic coupling, comprising:
(a) a male member having a leading face, an outer surface, a valve bore, a fluid passage extending from the valve bore to the outer surface of the male member, and first valve means in the valve bore to control fluid flow between the valve bore and the fluid passage;
(b) a female member having a receiving chamber for receiving the male member therein, a valve bore, a fluid passage extending from the valve bore to the receiving chamber, and second valve means in the valve bore to control fluid flow between the valve bore and the receiving chamber, the receiving chamber having first and second internal shoulders;
(c) at least one first flexible seal having an internal cavity, the first seal positionable on the first internal shoulder for sealing engagement with the receiving chamber and with the outer surface of the male member;
(d) first seal retaining means engageable with the receiving chamber to hold the first seal against the first internal shoulder;
(e) at least one second flexible seal having an internal cavity, the second seal positionable between the first and second internal shoulders for sealing engagement with the receiving chamber and with the outer surface of the male member;
(f) second seal retaining means engageable with the receiving chamber to hold the second seal between the first and second internal shoulders; and
(g) a seal locking member engageable with the female member, the seal locking member extending radially inwardly over the second seal.

14. The undersea hydraulic coupling of claim 13 wherein the first and second seal retaining means each comprise a locator ring positioned adjacent one of the seals and a snap ring engageable with the receiving chamber.

15. The undersea hydraulic coupling of claim 13 wherein the first and second seals are C-shaped metal seals and are expansible radially outwardly against the receiving chamber and radially inwardly against the outer surface of the male member.

16. The undersea hydraulic coupling of claim 13 wherein the seal locking member is provided with an annular groove, and an annular elastomeric seal positioned in the groove.

17. The undersea hydraulic coupling of claim 13 wherein the seal locking member is threaded to the female member.

18. The undersea hydraulic coupling of claim 13 further comprising an annular space between the first and second seals when the male member is inserted in the receiving chamber, the seals configured to prevent fluid from escaping out either end of the annular space.

19. The undersea hydraulic coupling of claim 13 wherein the receiving chamber is provided with an annular groove, and an annular elastomeric seal positioned in the groove.

* * * * *